(12) United States Patent
Bell et al.

(10) Patent No.: US 7,137,650 B2
(45) Date of Patent: Nov. 21, 2006

(54) SEAT BELT PRETENSIONER

(75) Inventors: John Bell, Carlisle (GB); Brian A. Jack, Annan (GB); David Blackadder, Corby Hill (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/157,642

(22) Filed: Jun. 21, 2005

(65) Prior Publication Data

US 2006/0076765 A1    Apr. 13, 2006

Related U.S. Application Data

(63) Continuation-in-part of application No. 11/145,766, filed on Jun. 6, 2005, which is a continuation-in-part of application No. 10/874,911, filed on Jun. 24, 2004.

(30) Foreign Application Priority Data

Jul. 26, 2004    (EP)    .................... 04254459

(51) Int. Cl.
*B60R 22/46* (2006.01)

(52) U.S. Cl. .................... 280/806

(58) Field of Classification Search ............ 280/801.1, 280/801.2, 806; 297/216.15, 216.16, 216.17, 297/216.18, 216.19, 470, 471, 472
See application file for complete search history.

(56) References Cited

U.S. PATENT DOCUMENTS

| | | |
|---|---|---|
| 4,917,210 A | 4/1990 | Danicek et al. |
| 4,999,004 A | 3/1991 | Skanberg et al. |
| 5,374,110 A | 12/1994 | Hiramatsu |
| 5,397,075 A | 3/1995 | Behr |
| 5,564,748 A | 10/1996 | Kmiec et al. |
| 5,639,120 A | 6/1997 | Kmiec et al. |
| 5,887,897 A | 3/1999 | Gill et al. |
| 5,911,440 A | 6/1999 | Ruddick et al. |
| 5,944,350 A | 8/1999 | Grabowski et al. |
| 5,967,440 A | 10/1999 | Marshall |
| 5,971,488 A | 10/1999 | Pedronno et al. |
| 6,036,274 A | 3/2000 | Kohlndorfer et al. |
| 6,039,353 A | 3/2000 | Bauer et al. |
| 6,068,664 A | 5/2000 | Meyer et al. |
| 6,113,145 A | 9/2000 | Evans |
| 6,142,524 A | 11/2000 | Brown et al. |
| 6,193,296 B1 | 2/2001 | Motozawa et al. |
| 6,213,511 B1 | 4/2001 | Downie et al. |
| 6,213,513 B1 | 4/2001 | Grabowski et al. |
| 6,238,003 B1 | 5/2001 | Miller, III et al. |

(Continued)

FOREIGN PATENT DOCUMENTS

DE    3341678 A1  *  5/1985

(Continued)

*Primary Examiner*—Faye M. Fleming
(74) *Attorney, Agent, or Firm*—Lonnie R. Drayer (57) ABSTRACT

A pretensioner for a three point seat belt has a cylinder adapted to be attached to a structural member of the vehicle and a piston disposed within the cylinder. The piston can move translationally relative to the cylinder in a pretensioning direction. A flexible member is arranged in a curved profile with a seat belt webbing being attached to the flexible member. The flexible member has a first end that can be pulled by the piston and a second end releasably connected to an exterior of the cylinder such that when the piston moves translationally relative to the cylinder the second end of the flexible member moves translationally relative to the cylinder along the exterior of the cylinder.

20 Claims, 7 Drawing Sheets

U.S. PATENT DOCUMENTS

| | | |
|---|---|---|
| 6,419,271 B1 | 7/2002 | Yamada et al. |
| 6,755,469 B1 | 6/2004 | Akaike et al. |
| 6,863,308 B1 | 3/2005 | Motozawa |
| 2002/0043796 A1 | 4/2002 | Webber et al. |
| 2003/0010560 A1* | 1/2003 | Motozawa ................ 180/268 |
| 2003/0029661 A1 | 2/2003 | Motozawa |
| 2003/0090101 A1 | 5/2003 | Ennerdal |
| 2003/0122362 A1 | 7/2003 | Ukita et al. |
| 2003/0230661 A1 | 12/2003 | Bell et al. |
| 2004/0046382 A1 | 3/2004 | Ball et al. |

FOREIGN PATENT DOCUMENTS

| | | |
|---|---|---|
| FR | 2 765 537 A | 1/1999 |
| JP | 50-35815 | 4/1975 |
| JP | 01-285438 | 11/1989 |
| JP | 02-147454 | 6/1990 |
| JP | 3153411 | 7/1991 |
| JP | 5085306 | 4/1993 |
| JP | 5105029 | 4/1993 |
| JP | 7196011 | 8/1995 |
| JP | 2001163179 | 6/2001 |
| JP | 2001213277 | 8/2001 |
| JP | 2001247010 | 9/2001 |
| JP | 2001301565 | 10/2001 |
| JP | 2002145013 | 5/2002 |
| JP | 2002211352 | 7/2002 |
| JP | 2002211353 | 7/2002 |
| JP | 2002211354 | 7/2002 |
| JP | 2002308045 | 10/2002 |
| JP | 2002337660 | 11/2002 |
| JP | 2002362311 | 12/2002 |
| JP | 2003025939 | 1/2003 |
| JP | 2003054360 | 2/2003 |
| JP | 2003081053 | 3/2003 |
| JP | 2003127829 | 5/2003 |
| WO | WO 95/31359 A | 11/1995 |

* cited by examiner

SEAT BELT PRETENSIONER

This is a Continuation-in-Part of application Ser. No. 11/145,766 filed Jun. 6, 2005; which is a Continuation-in-Part of application Ser. No. 10/874,911 filed Jun. 24, 2004.

FIELD OF THE INVENTION

The present invention relates to a pretensioner for a vehicle seat belt.

BACKGROUND OF THE INVENTION

Traditionally a seat belt comprises a length of seat belt webbing connected at three points to load bearing parts of a vehicle. Typically one end is bolted to a door sill on one side of the seat, and is arranged to pass laterally across the hips of the vehicle occupant to a buckle mechanism fixed to the vehicle on the opposite side of the seat, and then diagonally across the torso of the vehicle occupant to a further fastening point on the B pillar of the door. The buckle mechanism engages a buckle tongue slideably attached to the webbing.

To increase the comfort of the vehicle occupant restrained by the seat belt a retractor is attached to the pillar end of the webbing. This allows the webbing to pay out under relatively low loads to enable limited movement of the vehicle occupant, for example to reach in-car entertainment controls or storage compartments. The retractor is biased to keep the webbing relatively taut about the vehicle occupant and a locking element is included to lock the retractor against webbing pay out in the event of a crash being detected. For example, an acceleration sensor activates if the vehicle undergoes rapid acceleration or deceleration indicative of a crash.

In recent years, pretensioners have been introduced to rapidly pull in a length of seat belt webbing to tighten the seat belt about the vehicle occupant in of a crash. This takes up any slack that may have developed in the seat belt and helps to more correctly position the vehicle occupant in the seat to maximize the effect of the seat belt protection and of any secondary safety restraint such as an airbag.

Pretensioners comprise a force reservoir such as a pyrotechnically operated gas generator to provide an impulse of sufficient magnitude to tighten the seat belt in a short space of time, ideally before the crash takes full effect. A typical known pretensioner may use rotational means to wind in a length of seat belt webbing, for example by rotating the retractor spool in a webbing rewind direction to take in the required length of webbing prior to the retractor locking against webbing pay out.

However, known pretensioners tend to be bulky, and are particularly difficult to use for the driver and front passenger seats of a two door vehicle because of the requirement to allow access to the rear of the vehicle past the front seats. Using a traditional retractor pretensioner mechanism in a front seat of a two door vehicle causes an unacceptable obstruction.

Seat travel is greater in a two door vehicle than in a four door vehicle to provide access to the rear seat and to accommodate this the door sill end of the webbing is usually attached to a so-called slider bar of well known design, instead of being bolted to the floor. This allows the sill end of the webbing to be moved longitudinally forward and rearward to facilitate rear seat access and front seat movement. The present invention provides an improved pretensioning mechanism that can be used in two-door, front seat applications.

SUMMARY OF THE INVENTION

According to the present invention there is provided a pretensioner for a three point seat belt comprising: a cylinder adapted to be attached to a structural member of the vehicle and a piston disposed within the cylinder; a means for moving the piston translationally relative to the cylinder in a pretensioning direction; and a flexible member that is arranged in a curved profile with a seat belt webbing being attached to the flexible member, the flexible member having a first end that can be pulled by the piston and having a second end releasably connected to an exterior of the cylinder such that when the piston moves translationally relative to the cylinder the second end of the flexible member moves translationally relative to the cylinder along the exterior of the cylinder.

DETAILED DESCRIPTION OF THE INVENTION

Figure 1:
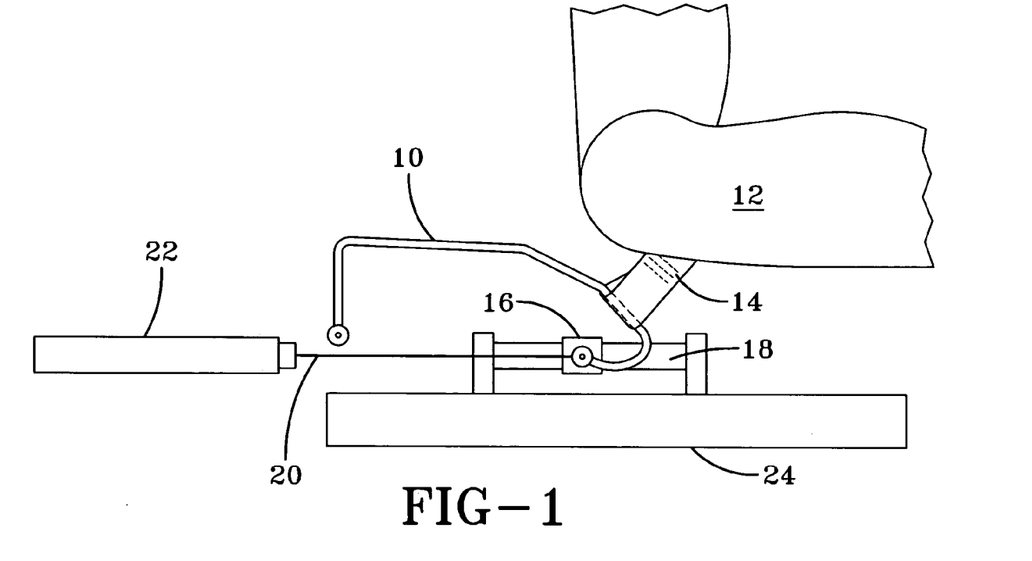
FIG. 1 is a schematic side elevation view of a pretensioner according to a first embodiment of the present invention.

In the first embodiment of FIG. 1, a slider bar 10 is positioned adjacent to a front seat 12 of a vehicle. One end of seat belt webbing 14 passes around the slider bar 10 and is free to move back and forth along the slider bar 10. The seat belt webbing 14 is of a conventional design and is attached at one end to a retractor mounted, adjacent a seat, to a structural member of the vehicle such as a vehicle side pillar (not shown). The webbing passes through a shoulder support also attached to the side pillar and has a buckle tongue, which is insertable into a buckle (not shown) located on the other side of the seat.

When in use, the seat belt webbing 14 is at one end of the slider bar 10 in the load bearing position shown in FIG. 1. When the seat belt is not in use the end of the webbing 14 may be moved in a rearward direction along the slider bar 10 so that it does not obstruct access to the rear seat of the vehicle.

As used herein and in the claims directions and positions such as "rearward" and "forward" are understood to be relative to the front and rear of a vehicle in which a seat belt system and pretensioner are installed.

One end of the slider bar 10 is attached to a carriage 16 that is mounted on a rail 18. The use of a rail is particularly beneficial since the pretensioning action can be constrained to a linear motion in one direction in a simple manner and without the need for complicated or bulky rotating parts. A cable 20 extends between the carriage 16 and a pyrotechnic unit 22. The pyrotechnic unit 22 is of a known type and contains a piston within a cylindrical housing and a gas generator. The gas generator is pyrotechnically activated to provide an impulse that forces the piston in a rearward direction and tensions the cable 20. The pyrotechnically operated gas driven piston-cylinder arrangement functions as a force reservoir. Such a pyrotechnic unit is particularly suited to this application since it provides an impulse of the required magnitude over a short time period. Positioning the piston and cylinder below the rail advantageously reduces the overall size of the pretensioner. The piston-cylinder arrangement may incorporate means to allow the second member to only move in a pretensioning direction, for example by ratchet teeth on the inside of the cylinder and at least one cooperating tooth on the piston.

Figure 2:
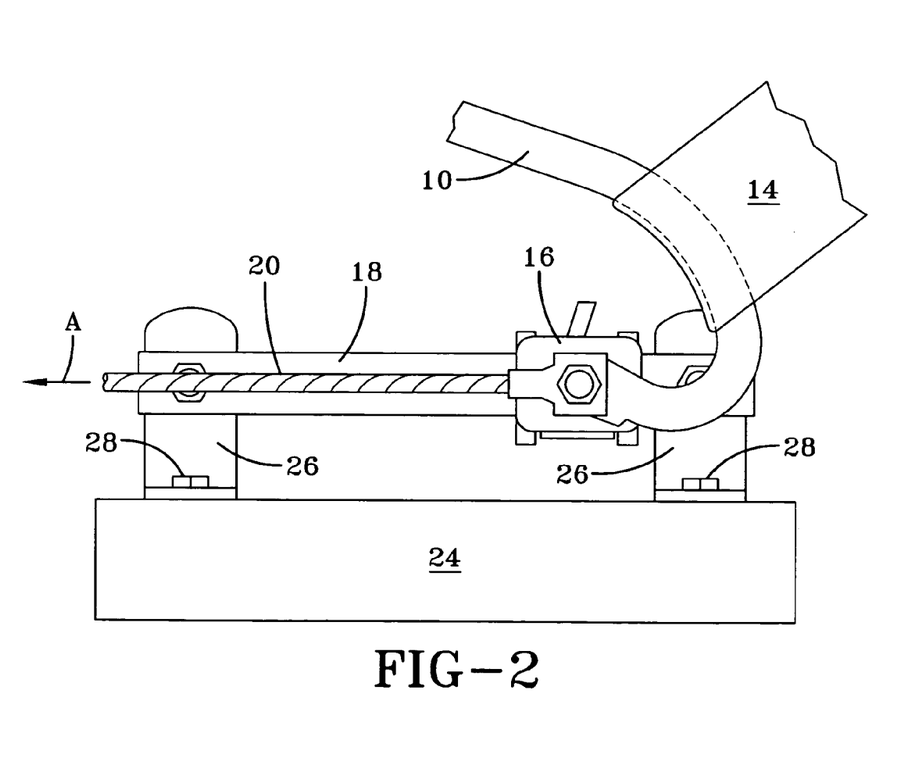
FIG. 2 is an enlarged side elevation view of part of the pretensioner of FIG. 1 before pretensioning.

FIG. 2 shows one arrangement of the carriage 16 and the rail 18 in greater detail. The rail 18 is attached at each end to support members 26 that are attached to a load bearing chassis member 24 by means of bolts 28. Such a load bearing chassis member 24 may be a structural member extending in a longitudinal direction down each side of the vehicle, or a load bearing door sill and provides a suitable load bearing anchorage zone for the slider bar 10 adjacent to and slightly to the rear of each of the vehicle doors.

Prior to pretensioning, the carriage 16 is positioned for normal use of the seat belt webbing 14 at its forward most position, at the right hand side as shown in FIG. 2 of the rail 18. Upon sensing an acceleration of the vehicle above a predetermined criteria, a crash sensor generates a signal indicative of a crash condition which causes the pyrotechnic unit 22 to fire, creating a tension in the metal cable 20. Advantageously the crash sensor is activated when the vehicle exceeds a predetermined acceleration or deceleration threshold. The tension in the cable 20 pulls the carriage 16 and the slider bar 10 in a rearward direction i.e. the direction indicated by an arrow A in FIG. 2. The carriage 16 can be arranged to move rearwardly a distance in the region of 50 to 150 mm depending on the vehicle size and requirements.

The sudden movement of the slider bar 10 in a rearward direction provides tension in the seat belt webbing 14, which takes up any slack in the webbing 14 and pulls a vehicle occupant backwards into the seat 12 to correctly position the vehicle occupant within the seat 12 to maximize the benefit of the seat belt and correctly position the vehicle occupant for maximum effect of any secondary restraint such as an air bag.

Figure 3:
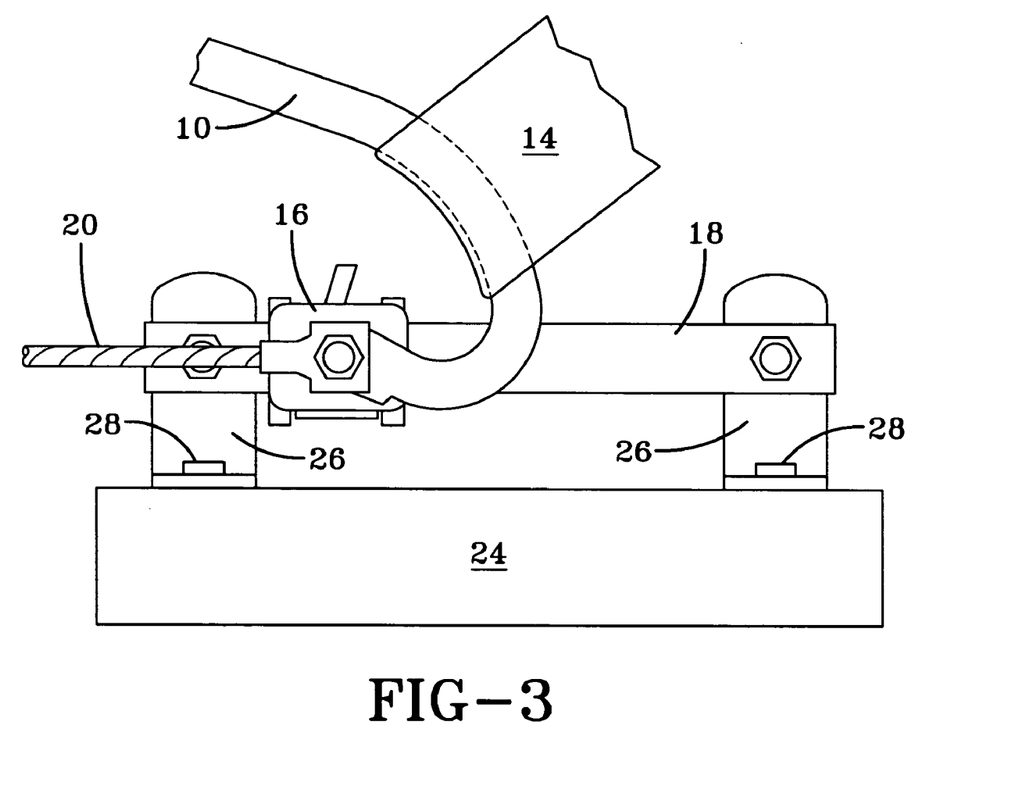
FIG. 3 is an enlarged side elevation view of part of the pretensioner of FIG. 1 after pretensioning.

FIG. 3 shows the position of the carriage immediately after pretensioning. After the pyrotechnic unit has fired, the carriage 16 is prevented from returning to its original position under the forward momentum of the vehicle occupant during a crash, by a ratchet mechanism within the carriage forming the second member 16. This ratchet mechanism is shown more clearly in FIG. 5.

Figure 5:
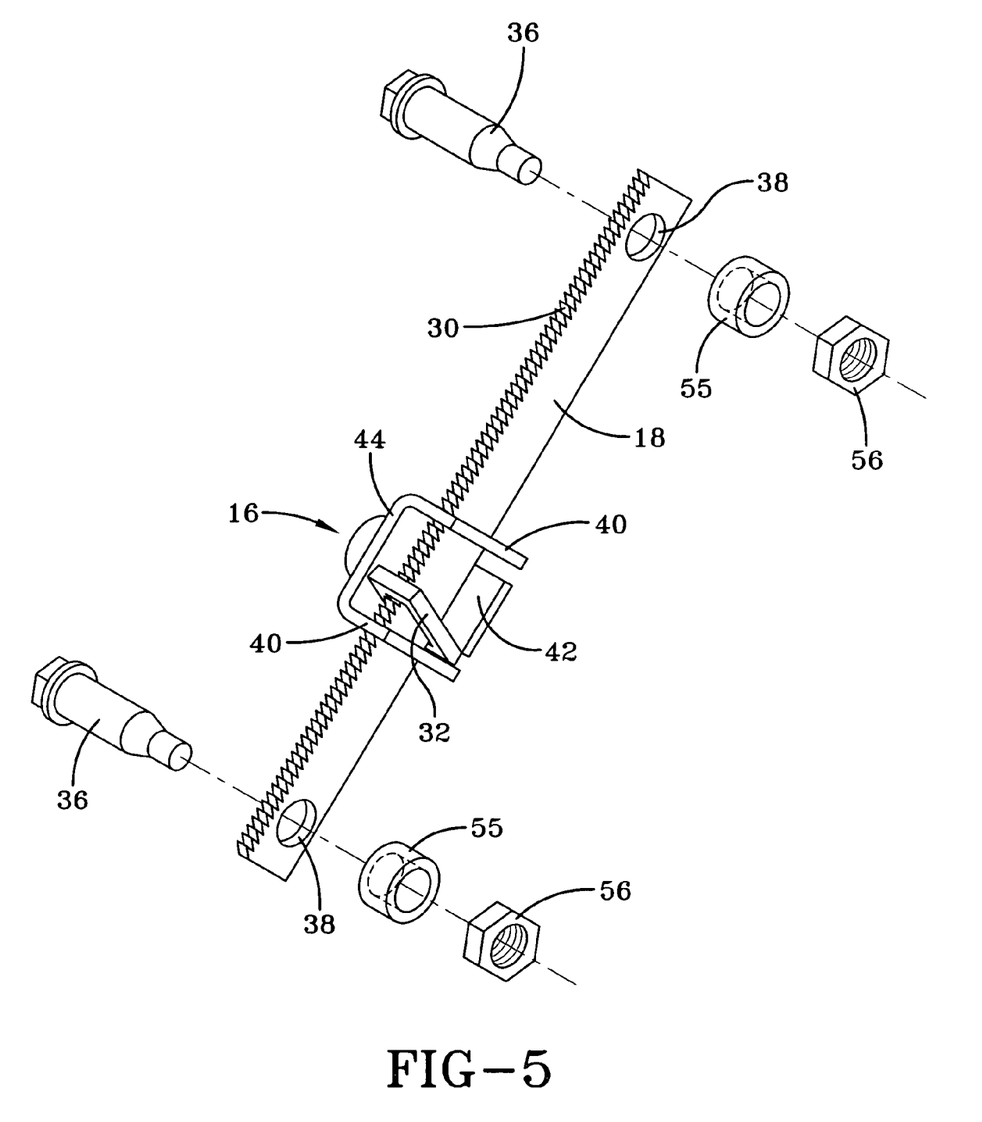
FIG. 5 is an exploded perspective view of the carriage and rail components the pretensioner of FIG. 1.

FIG. 5 is an exploded view showing the ratchet mechanism. The rail 18 is attached at each of its ends to respective support members 26 by bolts 36 passing through cylindrical holes 38 at each end of the rail 18. The bolts 36 are secured with appropriate washers or spacers 55 and nuts 56. Locking ratchet teeth 30 are formed in one surface of the rail 18. The carriage 16 has two end plates 40 and a base plate 42 attached to a side wall 44. A locking lever 32 extends from the base plate 42. Each of the end plates 40 and the locking lever 32 have a slot, allowing the rail 18 to pass through the center of the carriage 16.

An inner surface of the locking lever 32 is in contact with the teeth 30 in the surface of the rail 18 and is orientated at an angle such that the locking lever 32 can pass over the teeth 30 in one direction. However the locking lever 32 is biased such that if it tries to move in the opposite direction, a locking edge of the inner surface of the locking lever 32 will be caught against a tooth 30 on the upper surface of the rail 18 and thus prevents the carriage 16 from sliding in a reverse direction. To facilitate this the teeth 30 may be of a saw-tooth form. Locking the pretensioner against return movement in this way prevents a loss of tension in the seat belt after pretensioning has been carried out.

The slider bar 10, the carriage 16 and ratchet mechanism, the rail 18, the support members 26 and the bolts 28, 36 and 46 are all preferably made of metal. Ratchet mechanisms are known for different seat belt restraint applications and so the pretensioner of the present invention can advantageously be constructed using standard parts and manufacturing processes, and thus offers a relatively low cost locking mechanism. The ratchet mechanism and the carriage 16 may be formed from parts of a height adjuster traditionally used to alter the height of the belt shoulder support.

Figure 4:
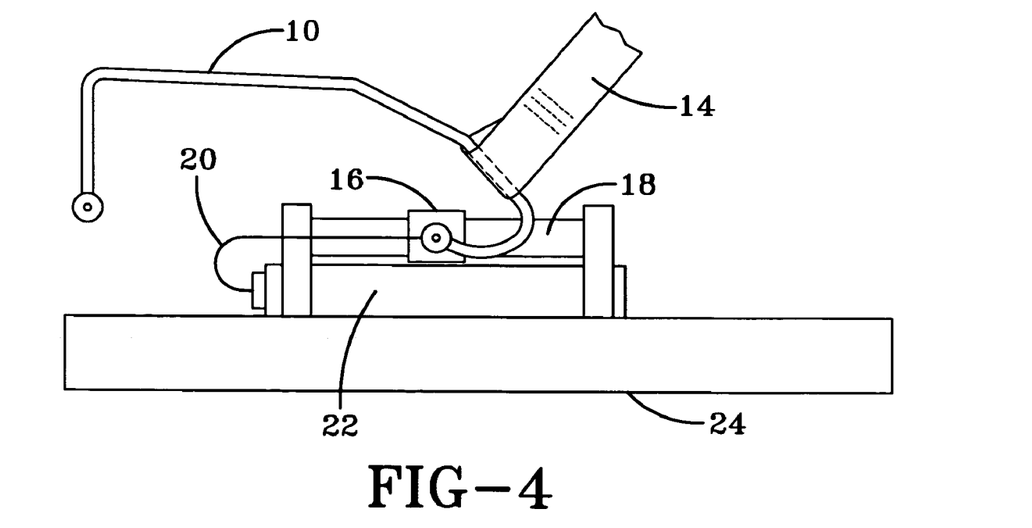
FIG. 4 is a side elevation view of an alternative arrangement of the pretensioner of FIG. 1.

In FIG. 4 the pyrotechnic unit is shown stored beneath the rail 18 and the bolts 36 and corresponding holes 38 in the rail may be used to fix the pyrotechnic unit 22 in relation to the rail 18. The operation of the pretensioner in FIG. 4 is substantially the same as that shown in FIG. 1, except that the cable 20 bends 180° to compensate for the different orientation of the pyrotechnic unit 22.

According to the further embodiments that are described below the slide bar function is carried out by having the seat belt webbing connected to an elongate flexible member such as, for example, a cable, around which the seat belt webbing passes. One end of the cable is moveable and the other end is fixed. The flexible member thus preferably form a loop, in the general form of a slider bar, to provide the flexibility of movement for the webbing and access to the rear of a vehicle, required in two-door applications.

Figure 6:
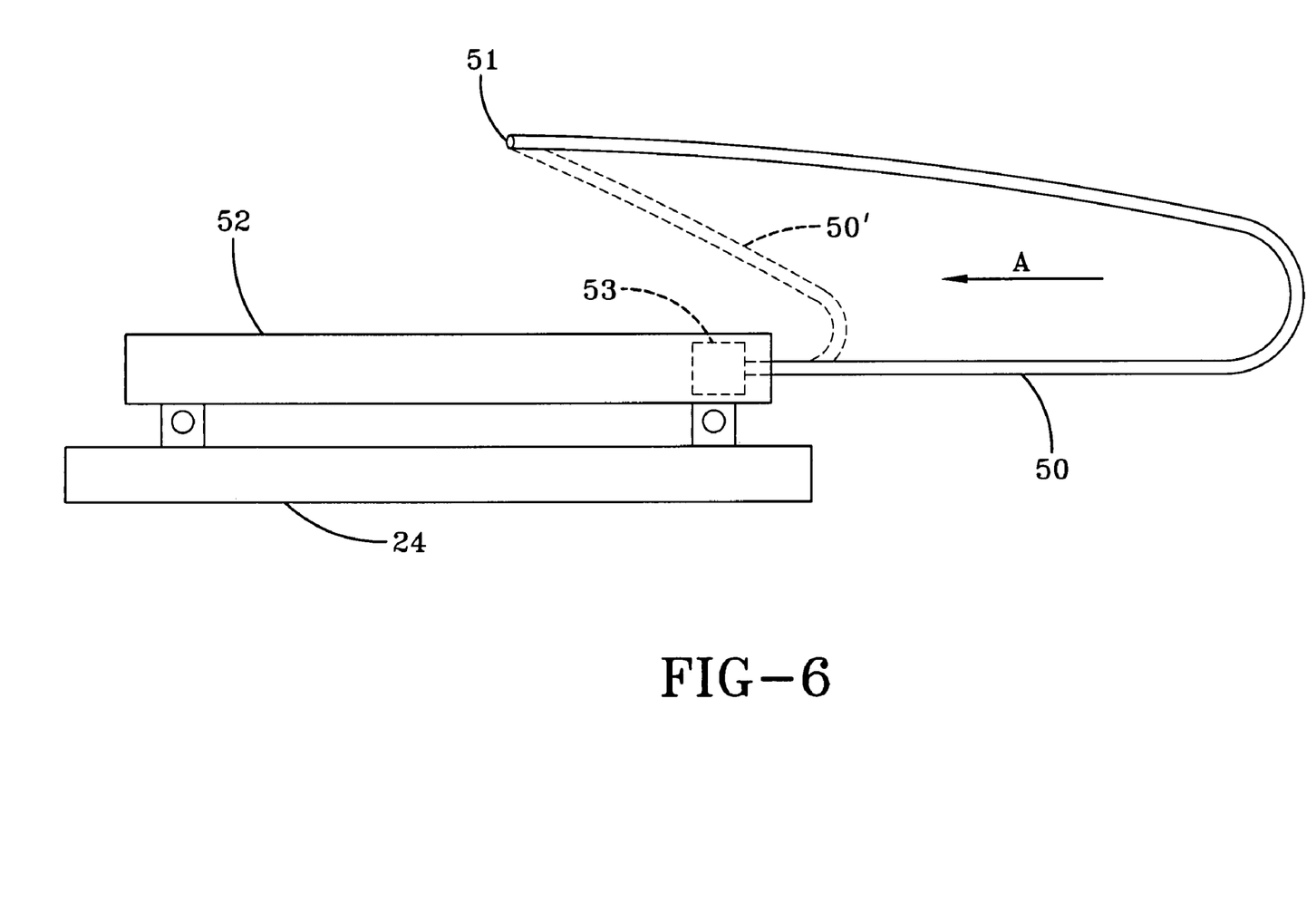
FIG. 6 is a schematic side elevation view of a pretensioner according to a second embodiment of the present invention.

FIG. 6 shows a second embodiment in which the slider bar of the first embodiment is replaced by a flexible cable 50. The flexible cable 50 preferably forms a loop, in the general form of a slider bar, to provide the flexibility of movement for the seat belt webbing and access to the rear of a vehicle, required in two door vehicle applications. The flexible cable may be directly attached to, or form at least a part of, the piston of the piston-cylinder arrangement which is preferably operated pyrotechnically. Thus this embodiment can provide an even more space saving alternative for two-door applications of pretensioners.

The seat belt webbing (not shown) is looped round the cable 50 in the same manner as with the slider bar 10 of FIG. 1 and the cable provides similar versatility of movement for the webbing mounting, and at least the same degree of access to the rear seats of the vehicle.

One end 51 of the cable 50 is attached to a structural member of the vehicle such as the sill, and the other end is attached to a piston 53 of a piston-cylinder pyrotechnic unit 52 which is attached to a structural member of the vehicle such as the floor of the vehicle, particularly to retain the door profile and avoid inhibiting access through the door.

The cable 50 forms a loop profile as shown in the figure and can be encouraged to hold such a profile in normal use by retaining clips or by an elastomeric plastic coating. Alternatively a flexible elastomeric plastic tube may cause the cable 50 to increase its stiffness to the appropriate degree.

When a crash sensor indicates that a sudden deceleration or acceleration is taking place, the pyrotechnic unit 52 is pyrotechnically activated to release gas to push the piston along the cylinder in the direction indicated by the arrow A, causing the cable 50 to retract to the profile indicated by the broken line 50'. This causes the seat belt webbing mounted on the cable 50 to be pulled back in the direction indicated by the arrow A thus effecting the required pretensioning.

A ratchet or other form of non-return mechanism may be built into the pyrotechnic unit 52.

Figure 7:
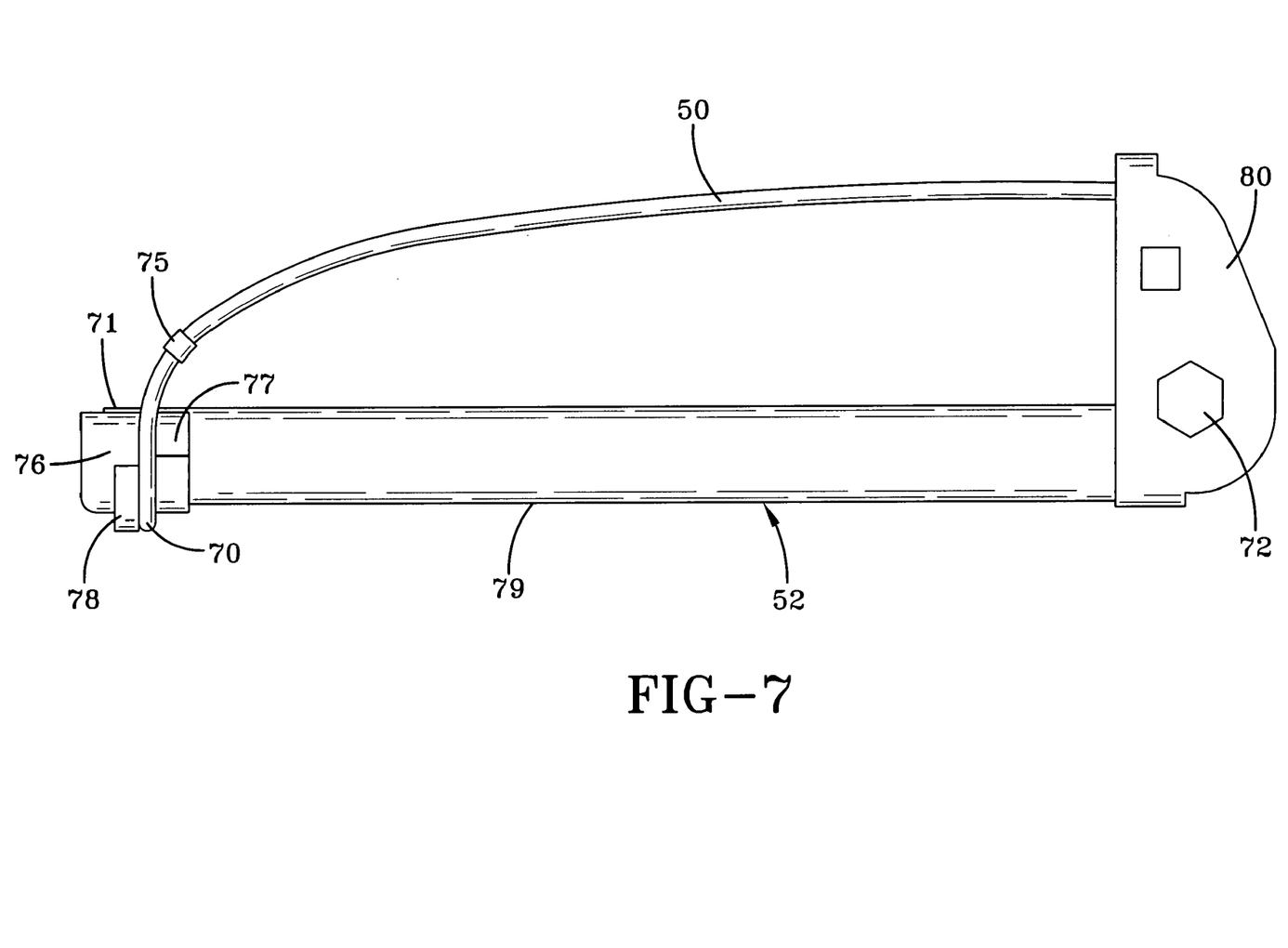
FIG. 7 is a side elevation view of a pretensioner according to a third embodiment of the present invention.
Figure 8:
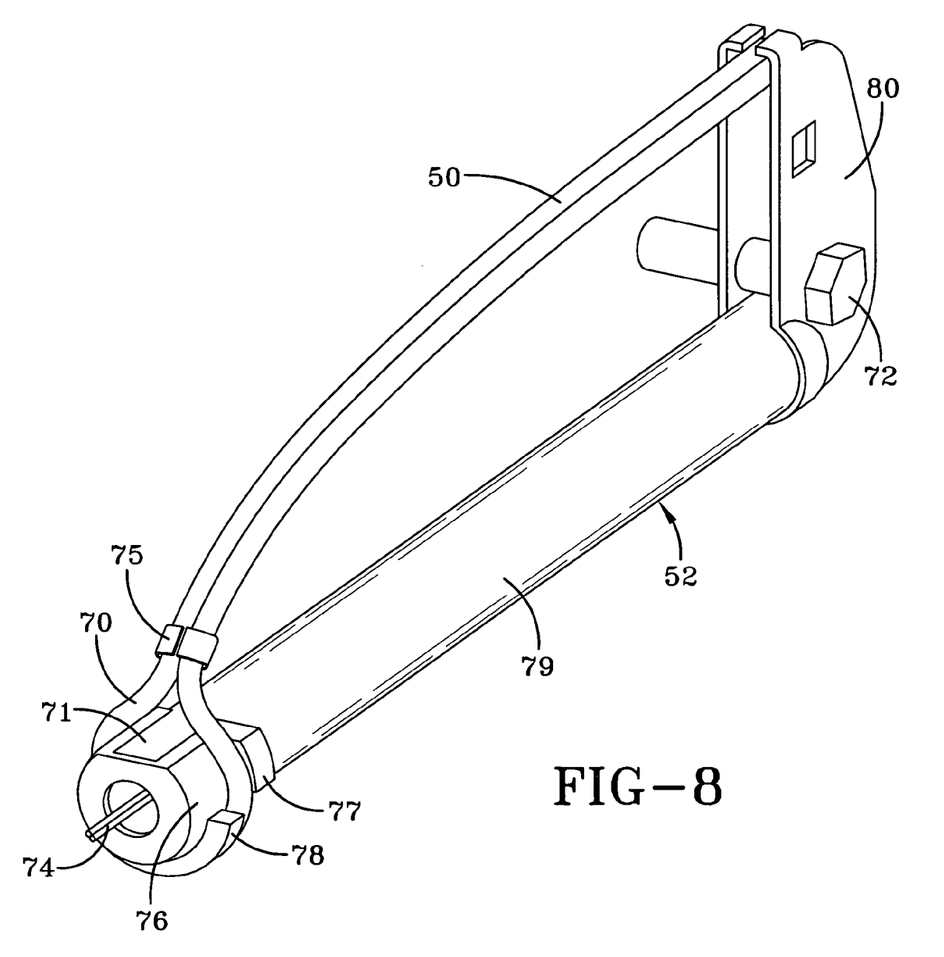
FIG. 8 is a perspective view of the pretensioner of FIG. 7.

FIG. 7 is a side elevation view of a pretensioner according to a third embodiment of the present invention and FIG. 8 is a perspective view of the pretensioner of FIG. 7. The cable may be a double cable, looped over the end of the cylinder and attached at the end in a releasable manner, for example by a member that shears, or by a mechanically releasable means. In this third embodiment a cable 50 is attached to the piston at one end of the cylinder of the pretensioner, and this cable is attached to the other end 71 of the cylinder. In this embodiment the cable 50 is folded to form a double cable and the free end is formed as a loop 70 which extends around the cylinder 79 of the pyrotechnic unit 52 and is hooked over an end 71 of the cylinder of the pyrotechnic unit. The loop 70 is secured around the cylinder 79 by a frangible or mechanically releasable means for securing which in FIGS. 7 and 8 is shown as a plastic attachment 76 mounted over the end 71 of the cylinder 79 with restraining abutments 77, 78 on either longitudinal side of the cable 50. As used herein and in the claims with respect to the restraining abutments "longitudinal" is understood to refer to the longitudinal axis of the cylinder 79. One of the abutments 77 shears when the cable 50 applies more than a predetermined force, releasing the loop 70 to slide along the cylinder of the pretensioner. Other suitable forms of means for securing the loop 71 to the end of the cylinder will be evident to a person skilled in the art.

In FIG. 7 the pyrotechnic unit 52 is attached to a structural member of a vehicle, such as a door sill or other load bearing beam, by a fastener 72, such as a threaded fastener, that extends through a first mounting member 80 located at the piston end of the cylinder 79 and a second mounting member (shown in FIG. 9) located at the other end 71 of the cylinder. According to a preferred embodiment, the structural member of the vehicle is a longitudinal chassis member such as the front door sill. The second mounting member, such as a structural member of the vehicle or a bracket bolted to the vehicle body, fits into the end of the cylinder to fix the pretensioner to the car in a load bearing manner. The second mounting member must withstand loads of around 15 kn, as specified in the standard vehicle anchorage pull test known as the R14 test. Suitable second mounting members will be evident to persons skilled in the art, and one is shown in FIG. 9 described below.

The cable loop 70 may be encased in a plastic tube allowing the cable loop to more easily slide along the cylinder 79. In addition a tie or clamp or plastic tube 75 encases a section of the cable to maintain the shape of the loop 70 by holding the double cable together. This plastic tube 75 may be longer than illustrated in FIGS. 7 and 8 to also protect the fabric of a seat belt from chaffing by the cable. A pair of wires 74 is shown exiting from the end 71 of the cylinder 79. These wires are for actuation of the pyrotechnic unit 52 located inside the cylinder 79 and could exit the cylinder at another point.

Figure 9:
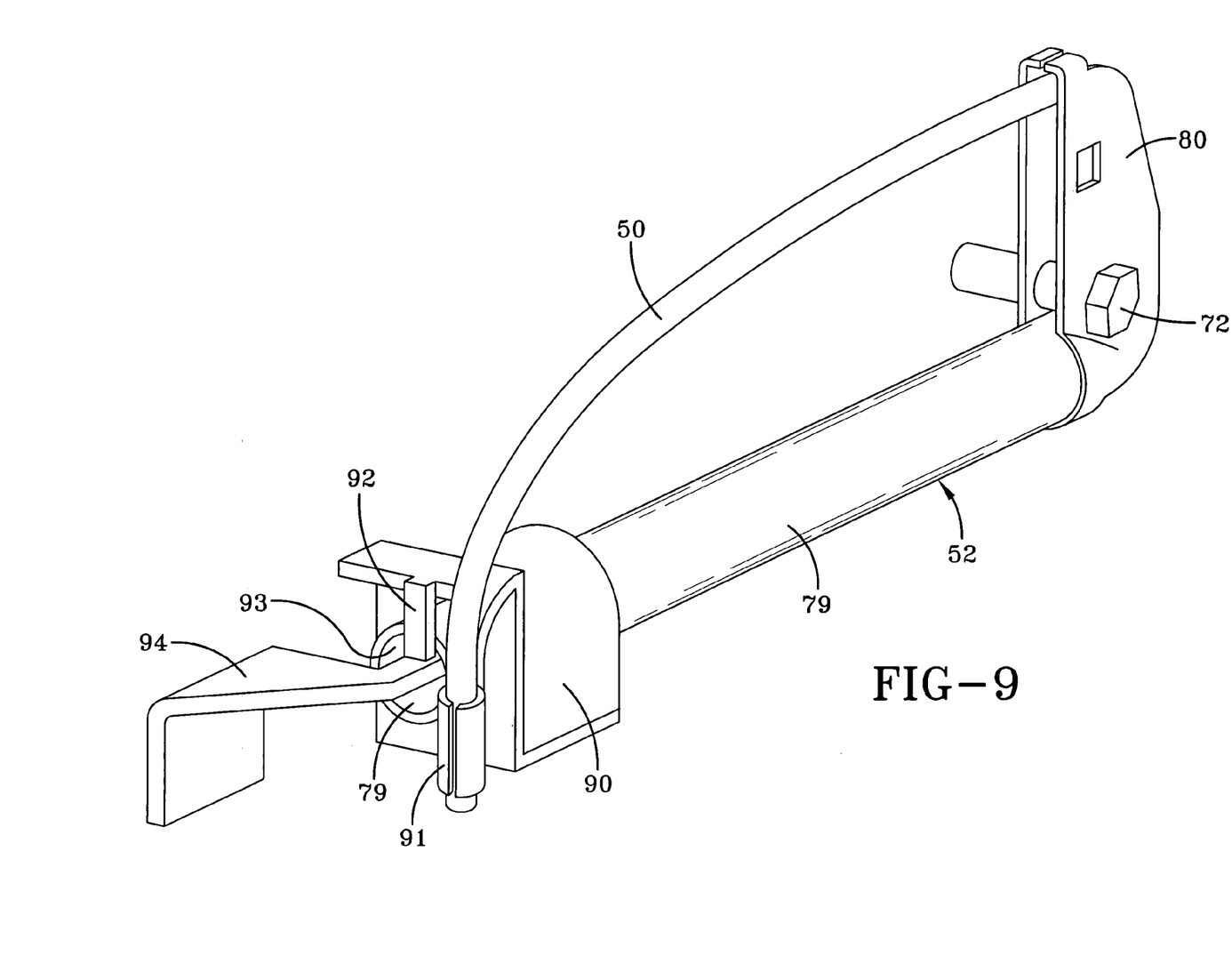
FIG. 9 is a perspective view of a pretensioner according to a fourth embodiment of the present invention.

In FIG. 9 a fourth embodiment is shown in which the cable 50 is a single cable and is attached to a carriage 90 that will slide along the cylinder 79 when the pretensioner is activated. The cable 50 is attached to the carriage 79 by welding the cable into a clamp or housing 91 mounted on the carriage 90.

The carriage 90 is retained at the end 71 of the cylinder 79 by a tongue 92 on the carriage 90 fitting into a recess 93 of the cylinder 79. When the pyrotechnic unit 52 located inside of the cylinder 79 is activated, the pull on the cable will be sufficient to shear this tongue 92 and allow the carriage 90 to travel along the cylinder 79, pulling the seat belt in a pretensioning direction. Alternatively the tongue 92 can be arranged to bend to effect release of the carriage from the recess 93. A further alternative would be to use a mechanically releasable mechanism. In FIG. 9 the second mounting member is a bracket 94 fitting into an end of the cylinder 79, which can be bolted or screwed to a structural member of the vehicle. Alternatively a carriage mechanism similar to that illustrated in FIG. 5 could be used.

Of course elements of the four embodiments described may be combined. For example the cable 50 could be attached to an arrangement such as the carriage 16 sliding on the rail 18, of FIG. 1. The pyrotechnic unit 52 could then be connected to the carriage 16 by another cable such as 20 in FIG. 1 and be mounted either in line with, or below, the rail 18.

Pretensioners can be constructed according to the invention having reduced or eliminated obstruction to rear seat access, smaller package sizes and which are attached to an appropriate door sill anchorage zone.

It is to be understood that the present invention is not limited to the details of any one embodiment in any one figure, but are defined by the appended claims. The scope of the appended claims should be interpreted to encompass all such modifications, similar arrangements and procedures.

The invention claimed is:

1. A pretensioner for a three point seat belt comprising:
a cylinder adapted to be attached to a structural member of the vehicle and a piston disposed within the cylinder;
a means for moving the piston translationally relative to the cylinder in a pretensioning direction; and
a flexible member that is arranged in a curved profile with a seat belt webbing being attached to the flexible member, the flexible member having a first end that can be pulled by the piston and having a second end releasably connected to an exterior of the cylinder such that when the piston moves translationally relative to the cylinder the second end of the flexible member moves translationally relative to the cylinder along the exterior of the cylinder in the pretensioning direction.

2. The pretensioner for a three point seat belt according to claim 1 wherein the flexible member is a cable.

3. The pretensioner for a three point seat belt according to claim 1 wherein a loop is located at the second end of the flexible member, the loop extending around the exterior of the cylinder, the loop being secured to the cylinder by a frangible member.

4. The pretensioner for a three point seat belt according to claim 2 wherein a loop is located at the second end of the cable the loop extending around the exterior of the cylinder, the loop being secured to the cylinder by a frangible member.

5. The pretensioner for a three point seat belt according to claim 1 wherein the second end of the flexible member is attached to a carriage, the carriage being configured to move along the exterior of the cylinder, the carriage secured to the cylinder by a frangible member.

6. The pretensioner for a three point seat belt according to claim 2 wherein the second end of the cable is attached to a carriage, the carriage being configured to move along the exterior of the cylinder, the carriage secured to the cylinder by a frangible member.

7. The pretensioner for a three point seat belt according to claim 1 wherein a loop is located at the second end of the flexible member, the loop extending around the exterior of the cylinder, the loop being secured to the cylinder by a mechanically releasable member.

8. The pretensioner for a three point seat belt according to claim 2 wherein a loop is located at the second end of the cable the loop extending around the exterior of the cylinder, the loop being secured to the cylinder by a mechanically releasable member.

9. The pretensioner for a three point seat belt according to claim 1 wherein the second end of the flexible member is attached to a carriage, the carriage being configured to move along the exterior of the cylinder, the carriage secured to the cylinder by a mechanically releasable member.

10. The pretensioner for a three point seat belt according to claim 2 wherein the second end of the cable is attached to a carriage, the carriage being configured to move along the exterior of the cylinder, the carriage secured to the cylinder by a mechanically releasable member.

11. A pretensioner for a three point seat belt comprising:
a cylinder adapted to be attached to a structural member of the vehicle and a piston disposed within the cylinder;
a pyrotechnically activated means for moving the piston translationally relative to the cylinder in a pretensioning direction; and
a flexible member that is arranged in a curved profile with a seat belt webbing being attached to the flexible member, the flexible member having a first end that can be pulled by the piston and having a second end with a loop is located at the second end of the flexible member, the loop extending around the exterior of the cylinder, the loop being secured to the cylinder by a member that releases the loop when the piston moves translationally relative to the cylinder, such that when the piston moves translationally relative to the cylinder the loop moves translationally relative to the cylinder along the exterior of the cylinder in the pretensioning direction.

12. The pretensioner for a three point seat belt according to claim 11 wherein the flexible member is a cable.

13. The pretensioner for a three point seat belt according to claim 11 further comprising means for restraining motion of the flexible member in a non-pretensioning direction after the loop has moved translationally relative to the cylinder along the exterior of the cylinder.

14. The pretensioner for a three point seat belt according to claim 12 further comprising means for restraining motion of the flexible member in a non-pretensioning direction after the loop has moved translationally relative to the cylinder along the exterior of the cylinder.

15. A pretensioner for a three point seat belt comprising:
a cylinder adapted to be attached to a structural member of the vehicle and a piston disposed within the cylinder;
a pyrotechnically activated means for moving the piston translationally relative to the cylinder in a pretensioning direction; and
a flexible member that is arranged in a curved profile with a seat belt webbing being attached to the flexible member, the flexible member having a first end that can be pulled by the piston and having a second end that is attached to a carriage, the carriage being configured to move along the exterior of the cylinder, the carriage secured to the cylinder by a member that releases the carriage when the piston moves translationally relative to the cylinder, such that when the piston moves translationally relative to the cylinder the carriage moves translationally relative to the cylinder along the exterior of the cylinder in the pretensioning direction.

16. The pretensioner for a three point seat belt according to claim 15 wherein the flexible member is a cable.

17. The pretensioner for a three point seat belt according to claim 15 further comprising means for restraining motion of the flexible member in a non-pretensioning direction after the carriage has moved translationally relative to the cylinder along the exterior of the cylinder.

18. The pretensioner for a three point seat belt according to claim 16 further comprising means for restraining motion of the flexible member in a non-pretensioning direction after the carriage has moved translationally relative to the cylinder along the exterior of the cylinder.

19. The pretensioner for a three point seat belt according to claim 15 further comprising a rail that extends along the cylinder and the carriage is mounted for sliding movement on the rail.

20. The pretensioner for a three point seat belt according to claim 19 wherein the piston and the cylinder are located below the rail.

* * * * *